Jan. 14, 1969  H. J. HAMMER  3,422,346

EDDY CURRENT INSPECTION SYSTEM

Filed Feb. 1, 1965  Sheet 1 of 3

*INVENTOR.*
HERMAN J. HAMMER
BY Watts & Fisher
ATTORNEY

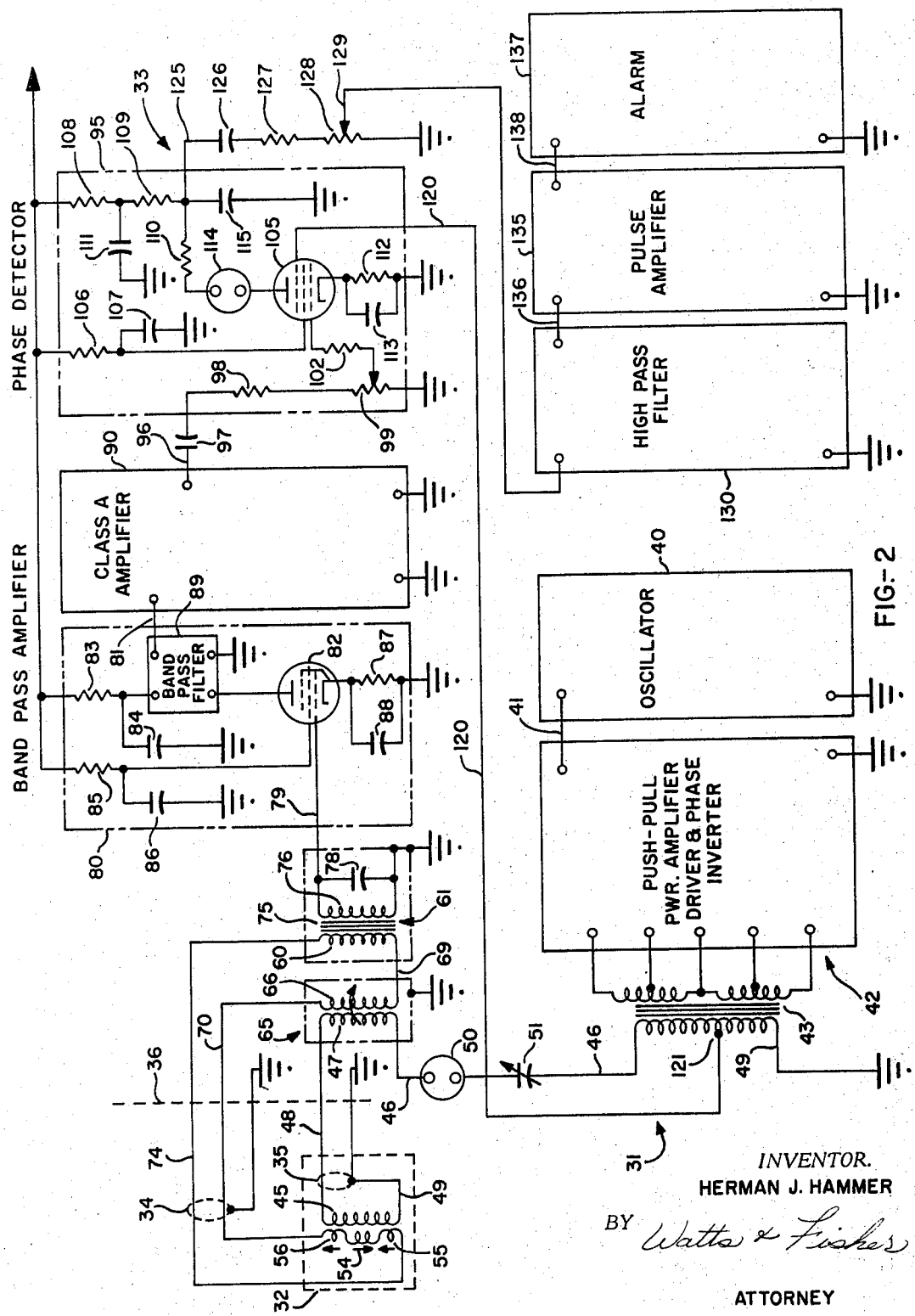

United States Patent Office 3,422,346
Patented Jan. 14, 1969

3,422,346
EDDY CURRENT INSPECTION SYSTEM
Herman J. Hammer, Cleveland, Ohio, assignor to Republic Steel Corporation, Cleveland, Ohio, a corporation of New Jersey
Filed Feb. 1, 1965, Ser. No. 429,595
U.S. Cl. 324—40     17 Claims
Int. Cl. G01r 33/14

The present system relates to inspecting workpieces for flaws and relates more specifically to an eddy current inspection system for the continuous inspection of workpieces for flaws.

In the manufacture of workpieces, particularly tubular workpieces, it is almost impossible to eliminate flaws entirely. For example, in welding the seams of tubes, as by an electric resistance welding process, harmful defects are not only introduced during rolling of the steel but also during the welding of the longitudinal seam. Because these defects occur in the manufacture of the tubular workpieces, it is necessary to carefully inspect them before shipment to a customer to insure a high standard of quality.

Several non-destructive testing methods are presently available for the inspection of tubular products such as pipe for flaws. Some of the most successful of the presently available testing systems utilizes eddy current inspection techniques. Examples of such prior eddy current testing systems are found in the following United States Patents: 2,065,379, H. C. Knerr et al.; 2,124,577, H. C. Knerr; 2,124,579, H. C. Knerr et al.; 2,415,789, C. Farrow; 2,416,517, C. Farrow; 2,434,203, C. Farrow; 2,455,792, F. A. Meunier.

These and other prior eddy current systems may employ one of several different basic circuit configurations. In one prior system, the flaw detector includes a pair of pick-up coils through which the tubular workpiece passes and which forms two legs of an impedance bridge. An oscillator provides an alternating current signal to the bridge circuit. The bridge is balanced to a null on a defect-free tubular workpiece so that little or none of the AC signal is impressed on the detector circuit by the pick-up circuit. When a defective section of a tubular workpiece passes through the coils, the defect in the workpiece causes a momentary unbalance in the bridge circuit which produces an AC output signal. This AC signal is passed to the detector circuit wherein it is amplified and those signals of a predetermined amplitude detected. The detected signals above a predetermined amplitude are then filtered and passed to operate an alarm circuit or other mechanism for properly acting upon the defective workpiece.

Other prior systems are sensitive to phase as well as to amplitude changes in the alternating current signal as caused by defects in the tubular workpiece. In these systems, the amplitude detector is replaced by an amplitude and phase detector. A reference voltage phase shifter is connected to the oscillator output and to a reference input on the amplitude and phase detector for adjusting the phase relationship between the oscillator output fed to the bridge circuit and the output oscillator fed to the reference signal input of the phase detector circuit. This system can then be made selective to certain defects by adjusting the phase relationship between the alternating current signal introduced to the bridge circuit and that introduced as a reference signal to the phase detector. In this system also, the bridge circuit must be balanced to a null on a defect free workpiece prior to operation.

In still other prior systems, a separate exciting coil is provided in co-axial relation to the sensing or pick-up coils to permit the application of higher exciting power than can be applied with a directly excited bridge circuit. These systems are also first balanced to a null point on a flawless or defect-free workpiece. The null is balancing these systems is obtained by injecting a bucking voltage into the sensing coil circuit. The bucking voltage is adjusted to balance the circuit to produce the null.

In still other systems, the output of the bridge circuit contains a fundamental or carrier frequency and an unbalanced condition in the bridge modulates the fundamental frequency to produce a flaw signal. The carrier frequency is then amplified, rectified, and passed through a low pass filter which filters out the fundamental frequency and passes the low frequency flaw signal onto an amplifier circuit and then to a suitable fault indicator circuit.

In almost all of these prior systems, a null or balanced condition is required during the passage of acceptable tubular workpieces through the coils to obtain maximum sensitivity to defects or flaws. The null or balanced condition must be closely held in order to maintain a consistent level of sensitivity of the inspection system. During an inspection operation, there are several changes or variables that can upset the null condition. For example, the null condition can be changed by (1) the axial position of the tubular workpiece in the sensing coil assembly, (2) the temperature of the tubular workpiece in the sensing coil assembly, (3) metallurgical changes in the tubular workpiece itself; and, (4) gradual diameter or gauge variations in the tubular workpiece.

The prior testing and inspection systems employing only a signal amplitude detection are the most sensitive to these listed variables. Those prior inspection systems employing phase detection as well as amplitude detection reduce the effects of the variations but do not eliminate them entirely or in many instances even substantially. Hence, in these prior inspection systems, a testing operator must be continuously present and adjust the electronic controls to maintain a null condition as the above-listed variables and others are encountered. As is apparent, to employ an operator to stand by for periodic adjustment of an inspection system is not only unsatisfactory from the standpoint of economics, but also because better quality control can generally be provided by an automatic apparatus which is not subject to human frailties.

The present invention provides a greatly improved electron apparatus which considerably reduces the effects of the listed variables encountered during flaw inspection. The effects of the usual variables which upset prior testing equipment are reduced to an extent such that continuous attendance is unnecessary. In the present system a balanced bridge is not utilized. Rather, a continuous carrier signal is utilized. In the present system, the exciting coil is energized with the carrier signal which then induces an eddy current in the workpiece. The eddy current in the workpiece induces a current signal in a pick-up coil assembly. The pick-up coil assembly comprises a plurality of coils wound in a differential arrangement such that the voltages induced in the coils nearly cancel each other and a very small voltage appears across the coils when a defect free workpiece is present. The signal output of the detector coil arrangement is coupled by a coupling or impedance matching transformer to a band pass amplifier. The band pass amplifier amplifies the signal output and passes the fundamental frequency of the carrier. This is amplified and introduced to an input of an amplitude limiting and phase detecting device. A preferred amplitude limiting and phase detecting device is a gated beam tube. The carrier signal which energizes the exciting coil is also introduced to a reference signal input of the gated beam tube. The output from the gated beam tube is then a function of the angular displacement between the carrier signal voltage introduced at its defect signal input and the alternating current reference voltage impressed at its reference signal input. The output of the gated beam detector tube is integrated by a suitable capacitive device and then differentiated by a high-pass filter. The differentiated signal pulse is coupled to a pulse amplifier where it is amplified and then coupled to an alarm circuit or other system for indicating or otherwise acting upon the defective workpiece.

The present system makes it possible to inspect welded tubing at the welder immediately following the welding process, thus providing instant information about the quality of the weld. Because of this advantage of the present system, poor welds may be spotted at once and correction can be quickly made so that the amount of scrap produced is greatly reduced as compared to prior inspection systems.

Another advantage of the present system is that it is not affected by variations in the temperature of the tubular workpiece or even of a coolant flowing on the workpiece during an inspection. Small variations in tubular workpiece diameter, gauge, or metallurgical condition have little or no effect on the present testing system. Overall stability is much superior to that of prior systems. The present system requires fewer operating controls than those of prior systems. In the present system, one control is necessary only in large workpiece applications to produce an optimum detector input carrier level whereas with almost all conventional eddy current testing systems, two controls are needed to obtain a null or balance condition which is required for satisfactory operation. In addition, fewer electronic components are required than in conventional inspection systems. Finally, the detector coils of the present system require from one-tenth to a one-one hundredth as many turns as the detector coils used with conventional testers. This reduces the cost of the testing coil assembly considerably.

These and further objects and advantages and a fuller understanding of the invention may be obtained from the following description and claims when taken in conjunction with the drawings in which:

In the drawings:

FIGURE 2 is a schematic diagram of the electronic circuits of the inspection system of FIGURE 1.

Figure 1:
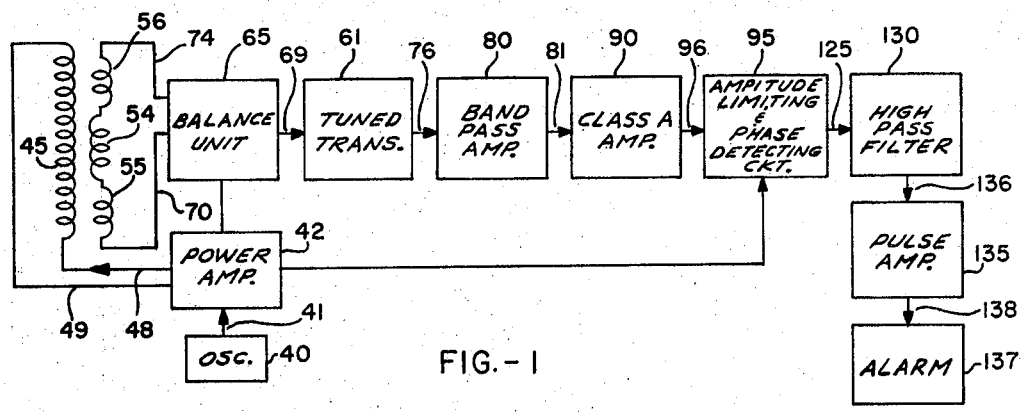
FIGURE 1 is a block diagram of the non-destructive inspection system of the present invention.
Figure 3:
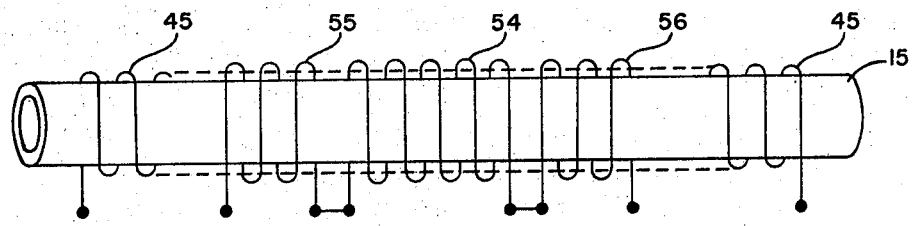
FIGURE 3 is a schematic showing of an inspection or testing coil assembly of the present invention.

Referring now to the drawing, the present eddy current inspection system is indicated generally by the reference character 31. Referring to FIGURE 1, an oscillator 40 supplies a high frequency voltage to a push-pull amplifier driver and phase inverter 42 via a conductor 41. The push-pull amplifier 42 supplies an exciting current to an exciting winding 45 via conductors 48, 49. Alternating current flowing through the exciting coil 45 induces an eddy current flow in a tubular workpiece 15 (FIGURE 3) as the workpiece passes through a testing coil assembly 32 comprised of the exciting coil 45 and testing or pick-up coils 54–56. Magnetic flux produced by the current flowing in the tubular workpiece 15 induces an AC voltage in the detector coils 54–56. The detector coils 55, 56 are differentially wound relative to the winding 54 so that the voltage induced in the winding 54 is nearly cancelled by the sum of the voltages induced in the coils 55, 56. Conductors 70, 74 connect the pick-up coils 54–56 to the input of a carrier level adjusting balance unit 65 which partially compensates for large imbalances between the voltages induced in the main detector coil 54 and that induced in the differential coils 55, 56.

The output of the carrier level control unit 65 is coupled by a tuned or impedance matching transformer 61 to the input of a band pass amplifier 80. The band pass amplifier 80 amplifies and passes the fundamental frequency of the carrier signal to a class A amplifier 90. There the carrier signal is amplified and introduced to the input of an amplitude limiter and phase detector 95. A reference voltage is also introduced to the amplitude limiter and phase detector 95 from the power amplifier 42 via a line 120. The amplitude limiter and phase detector 95 compares the reference signal to the carrier signal for a predetermined phase difference. A defect in a workpiece passing through the testing coil assembly affects the amplitude and phase of the carrier signal. The phase detector 95 detects this phase change in the carrier signal by comparing it to the reference signal and produces an output defect pulse wherever a predetermined phase difference appears in the two signals. The amplitude limiting action of the detector 95 ignores the small amplitude changes in the carrier signals which are caused by variables and not defects. The output defect pulse is differentiated by a high-pass filter 130 and is introduced to a pulse amplifier 135 where it is amplified sufficiently to operate an alarm circuit 137.

Referring now to FIGURE 2, the inspection system 31 may be physically separated into two units, the testing coil assembly 32 through which the tubular workpiece 15 undergoing inspection is passed, and an electronic circuit indicated generally by the reference character 33. The electronic unit 33 may be housed in a suitable cabinet at the side of a testing station which may contain the testing coil assembly 32 and through which the workpiece passes for inspection. The testing coil assembly 32 is connected to the electronic chassis 33 by shielded cables 34, 35. The testing coil assembly 32 may be separated from the electronic chassis 33 by suitable connectors (not shown) interposed in the cables 34, 35 in a location indicated by the broken line 36.

The high frequency oscillator 40 supplies the carrier signal for the inspection system. The oscillator 40 is conventional and any commercially available oscillator is suitable. Preferably, the output frequency provided by the oscillator for the carrier signal is 22 kilocycles. Carrier signals of frequencies between 4 kilocycles and 100 kilocycles have been found to also work satisfactorily. The output of the oscillator 40 is connected via a conductor 41 to the input of the push-pull power amplifier driver and phase inverter 42. An output transformer 43 which is a part of the push-pull amplifier 42 is shown to provide an indication of the connections of the push-pull amplifier 42 to the remainder of the inspection system. The push-pull amplifier 42 is also conventional and may be one of many commercial designs, with the limitation that it must have an output capacity of at least 10 watts.

The exciting winding 45 in the testing coil assembly 32 is connected to the output of the push-pull amplifier 42 via a conductor 46, a winding 47, the conductor 48 in the shielded cable 35, conductor 48 and the conductor 49 which is grounded. The exciting coil 45 constitutes the principal load on the power amplifier 42.

An AC ammeter 50 is interposed in the conductor 46 to indicate the amplitude of current flowing in the exciting coil circuit. A capacitor 51 is interposed in the conductor 46 so as to be connected in series with the exciting coil 45. The capacitor 51 is of such a value as to make the entire circuit comprising the output transformer 43, the capacitor 51, the ammeter 50, the winding 47 and the exciting coil 45 a series resonant circuit. This is done to obtain maximum current flow which will produce the maximum possible excitation of a tubular workpiece passing through the testing coil assembly 32.

The coil arrangement of the testing coil assembly 32 comprises three single layer detector coils or windings 54–56 connected differentially as shown by the polarity arrows. The center winding 54 is considered to be the main defect sensing winding. As an example, it comprises twenty turns of No. 36 enameled copper wire wound in a single layer. The outer windings 55, 56 comprise, for example, ten turns each of No. 36 enameled copper wire wound in a single layer.

Alternating current flowing through the exciting coil 45 induces an eddy current flow in a tubular workpiece 15 as the workpiece passes through the testing coil assembly 32. Magnetic flux produced by the current flowing in the tubular workpiece links the windings of the detector coils 54–56 and induces AC voltages in them. The outer windings 55, 56 are wound in an opposing or differential relation to the main detector winding such that the voltages induced in the main detector coil or winding 54 is nearly cancelled by the sum of the voltages induced in the differential coils or windings 55, 56.

It has been found that it is almost impossible to construct a testing coil assembly in which voltages induced in the outer differential coils 55, 56 absolutely cancel the voltages induced in the main detector coil 54. Where the testing coils are wound for testing small diameter tubular workpieces, it has been found that the coils can be wound so that the voltages induced nearly cancel. In those testing systems having coils wound for testing small diameter tubular workpieces particularly, the detector coils 54–56 can be connected directly to a primary winding 60 of the impedance matching transformer 61. In the case of those testing systems having very large detector coils, extreme care must usually be taken in constructing the testing coil assembly to assure that the imbalance between the voltages induced in the main detector winding and the differential windings is kept small.

Figure 4:
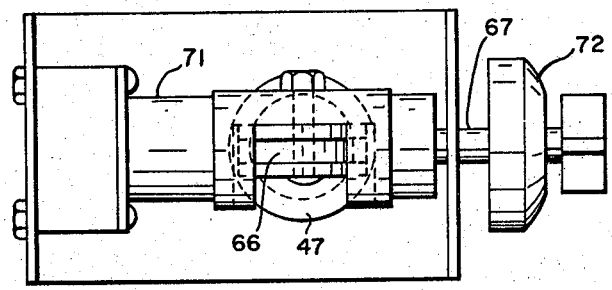
FIGURES 4 and 5 are side views taken at right angles to one another of a balance unit employed in the inspection system of the present invention.
Figure 5:
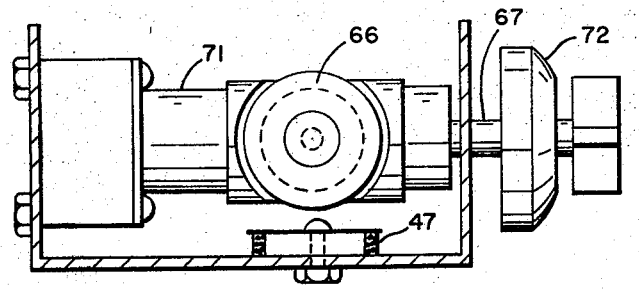

In order to simplify construction of the large testing coil assemblies, and to reduce the need for extremely close coil matching, a balancing or matching transformer unit 65 is provided. The balancing unit 65 provides for the introduction of a second AC voltage for partial cancellation of some of the incoming AC voltage from the detector assembly to compensate for differences in the detecting coils 54–56. As shown in FIGURES 2, 4 and 5, the balancing unit 65 comprises the primary winding 47 and a secondary winding 66. The primary winding 47 is a stationary coil and is connected in series with the exciting coil energizing circuit so that the magnetic field produced by the current flowing through the primary winding 47 is proportional to the current flowing in the exciting coil 45. The secondary winding 66 is a movable coil rotatably carried by a shaft 67 so that it can be rotated from a position parallel to the primary coil 47 to a position perpendicular to it. The secondary coil 66 is connected to a conductor 69 and the conductor 70 by a slip ring assembly 71. The balancing unit 65 thus acts as a transformer in which the coupling between its primary and secondary windings 47, 66 respectively, can be controlled by positioning the secondary by means of the control knob 72. Maximum coupling is provided when the coils 47, 66 are in a parallel relation and minimum coupling is provided when they are in a perpendicular relation. The voltage induced in the secondary coil 66 is connected to the detector coils 54–56 via the conductors 70, 74 in the shielded cable 34. The voltage induced in the movable secondary coil 66 of the balancing unit 65 is vectorially added to the voltage produced by the detector coils 54–56. This vectorial addition is shown in FIGURES 6a, 6b.

Figure 6:
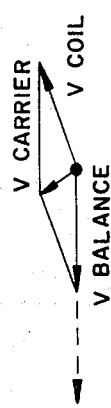
FIGURES 6a, 6b are vector diagrams showing the vector addition of voltages which provide the modified balanced carrier signal in the inspection system of the present invention.

As shown in FIGURE 6a, the vectorial addition of the balance voltage (V balance) across the secondary winding 66 to the voltage (V coil) across the detector coils 54–56 determines the magnitude and phase angle of the carrier voltage (V carrier) introduced to the remainder of the inspection system. The secondary winding 66 of the balancing unit 65 may therefore be rotated to compensate for large imbalance voltages from the detector coils 54–56 and to adjust the carrier voltage introduced to the detector circuit 95 so that it is within the operating range of the detector circuit 95. The (V balance) is always of such a phase relationship to (V coil) that a complete voltage cancellation cannot take place.

Both the detector coils 54–56 and the balancing unit 65 are low impedance elements. The impedance matching transformer 61 is provided to obtain a proper impedance match between these low impedance elements and the grid of the band pass amplifier tube 82 in the amplifier 80. The impedance matching transformer 61 includes the primary windings 60 which is a very low impedance coil, an adjustable ferrite core indicated schematically by the parallel lines 75, one of which has an arrowhead attached to indicate core movability, and a secondary coil 76. As an example, the primary impedance of this transformer is generally less than 5 ohms. The secondary impedance is approximately 5,000 ohms. A capacitor 78 is connected across the secondary winding 76 and forms a circuit which is nearly resonant with it. Changing the core position of the transformer 61 shifts the circuit between the leading and lagging edges of its resonant curve. In other words, shifting the position of the ferrite core changes the inductance of the winding 76 and makes the nearly resonant circuit either more inductive or more capacitive. The nearly resonant circuit provided by the capacitor 78 and the winding 76 provide the requisite phase shift in the carrier signal for use with the phase detector 95 so that it is not necessary to phase shift the reference signal to obtain optimum response to flaws in the workpiece.

A conductor 79 connects the secondary winding 76 to the control grid of the band pass amplifier tube 82 and couples the voltage from the balancing unit 65 to the band pass amplifier 80. The band pass amplifier tube 82 is a conventional 6AU6 pentode tube. A resistor 83 connects the plate of the tube 82 to a positive voltage plate supply B. A capacitor 84 is connected from between the resistor 83 and the plate of the tube 82 to ground. The resistor 83 and the capacitor 84 serve as plate circuit decoupler. A resistor 85 is connected from the screen grid of the tube 82 to the positive plate supply B and serves as a screen voltage dropping resistor. A capacitor 86 is connected from the screen grid to ground and operates as a screen bypass. A cathode bias resistor 87 and a cathode bypass capacitor are connected in parallel between the cathode of the tube 82 and ground.

A band pass filter 89 has its input connected in the plate circuit of the tube 82 and its output connected to the conductor 81. The band pass filter 89 is a commercial telemetering band pass filter having preferably a maximum band width of ±7.5 percent. The band pass filter passes the fundamental carrier frequency and filters out any 60 cycle noises and spurious electrical noises such as from contact arcing. The band pass filter 89 acts as a plate load for the amplifier tube 82 and couples the signal carrier voltage to the input of the class A amplifier 90 for further linear amplification of the signal carrier. The class A amplifier 90 is conventional and is connected to the input of an amplitude limiter and phase detector 95 via the conductor 96. A capacitor 97 is interposed in the conductor 96 and couples the carrier signal from the class A amplifier to the amplitude limiter and phase detector 95.

In the amplitude limiter and phase detector 95, a resistor 98 and a potentiometer 99 are connected from the input conductor 96 to ground and form a voltage divider network to reduce the signal input to the phase detector 95 to a usable level. A resistor 102 connects the variable voltage tap of the potentiometer 99 to the control grid of a 6BN6 gated beam tube 105 and serves as a grid isolating resistor for the gated beam tube 105. The variable tap of the potentiometer 99 serves as a detector input control to control the amplitude of the carrier signal input to the detector circuit 95. The gated beam tube 105 serves as a phase detector, amplifier and limiter.

An accelerator grid dropping resistor 106 connects the accelerator grid of the detector tube 105 to the positive plate voltage supply B. An accelerator grid bypass capacitor 107 is connected from the accelerator grid of the tube 105 to ground. A plate decoupling resistor 108, a plate load resistor 109 and a plate linearity resistor 110 are connected in series between the plate of the detector tube 105 and the positive plate voltage supply B. A plate decoupling capacitor 111 is connected from between the resistors 108, 109 to ground. A cathode bias resistor 112 and a cathode bypass capacitor 113 are connected in parallel from the cathode of the tube 105 to ground. A milliameter 114 is connected in series in the plate circuit for indicating detector tube plate current. A capacitor 115 is connected to the plate circuit at a voltage divider point between the resistors 109, 110 and to ground and serves as an integrating capacitor. A conductor 120 connects a quadrature grid of the detector tube 105 to a low impedance tap 121 of the power amplifier output transformer 43. The AC voltage signal coupled to the quadrature grid of the gated beam detector tube 105 is the reference voltage for the phase detector 95. A conductor 125 is connected to the plate circuit of the gated beam tube 105 between the resistors 109 and 110 and is the output conductor for the amplitude limiter and phase detector 95.

Because the detector tube 105 is an electron beam gating device, the gated beam tube 105 is an effective phase detector also. A defect signal output from the gated beam tube 105 impressed upon the conductor 125 will be a function of the angular displacement between the carrier signal voltage impressed on the limiter grid via the input conductor 96 and the AC reference voltage impressed on the quadrature grid by the conductor 120.

A coupling capacitor 126 interposed in the conductor 125 couples the output defect pulses from the detector circuit 95 to a voltage divider comprising a resistor 127 and a potentiometer 128. The potentiometer 128 functions as a tester sensitivity control. The amplitude of the defect pulses produced by the detector circuit 95 can be varied by adjusting the position of the slider of the potentiometer 128. A conductor 129 connects the slider of the potentiometer 128 to the input of the high pass filter 130. The high pass filter 130 differentiates the output defect signal pulses. The output defect signal pulses are coupled to a pulse amplifier 135 via a conductor 136. The defect signal pulses are amplified by the pulse amplifier 135 and are coupled to an alarm circuit 137 via the conductor 138. The alarm circuit 137 contains a defect indicating device. The alarm circuit also contains a relay to operate a marking device or a sorting device to register defects in the tubular workpieces. A suitable device for marking the location of defects in a workpiece is disclosed in a copending application, Ser. No. 271,788, filed Apr. 9, 1963 now Patent No. 3,180,230, by T. W. Judd, et al. and assigned to the same assignee as this application. A suitable apparatus for sorting the workpieces according to defect severity is disclosed in a copending application, Ser. No. 365,097, filed May 5, 1964 now Patent No. 3,263,809, by Joseph M. Mandula, et al. and assigned to the same assignee as this application.

ALIGNMENT

Before the present inspection system will detect defects in tubular workpieces, a certain alignment procedure is performed prior to completing the installation of the system in a workpiece mill. Assuming that the testing coil assembly 32 is connected to the electronic chassis 33 and the power has been turned on, the following alignment procedure is followed:

(1) A defect free section of a tubular workpiece is inserted into the testing coil assembly 32.

(2) The exciting or primary circuit tuning capacitor 51 is adjusted to provide maximum current flow in the exciting coil circuit.

(3) The output of the oscillator 40 is adjusted so that a minimum of 2.5 volts RMS is impressed on the quadrature grid of the gated beam tube 105 by the conductor 120.

(4) The normal operating point of the gated beam detector 105 is at a plate current of 0.5 ma. as indicated by the plate ammeter 114. This is obtained by adjusting the relative positions of the primary and secondary windings 47 and 66 of the balance unit 65.

(5) With the ammeter 114 in the detector plate circuit indicating 0.5 ma., the voltage at the limiter grid of the gated beam tube 105 is measured. If the measured voltage is not within a range of, for example, 0.7 to 1.25 volts RMS, the detector input control potentiometer 99 is adjusted to bring the voltage within this required range. Adjusting this voltage should have little effect on the detector plate current.

However, if the detector plate current does change, then the balancing unit 65 is adjusted to bring the detector plate current back to 0.5 ma. The voltage at the limiter grid is remeasured and reset between 0.7 and 1.25 RMS. The preceding measurements and adjustments are repeated until the detector plate current measures 0.5 ma. with a voltage amplitude of between 0.7 and 1.25 RMS supplied to the limiter grid of the gated beam tube 105. These adjustments can be carried out with or without a tubular workpiece in the testing coil assembly 32.

(6) A defective tubular workpiece which can be made by drilling holes in a defect-free tubular workpiece, is passed through the testing coil assembly 32 and the defect indications are noted.

(7) A defect free tubular workpiece is again inserted in the testing coil assembly. The movable winding 66 of the balance control 65 is rotated until the detector plate current meter again indicates 0.5 ma.

Steps 6 and 7 above are then repeated until the movable coil 66 of the balance unit 65 has been rotated a full 360°. Either two or four positions of the movable coil 66 will be found at which the detector tube plate current equals 0.5 ma. If two positions are found at which the detector plate current equals 0.5 ma., the defect indications produced at one such coil position will be similar to those shown in FIGURE 9, and at the other point, the defect indications will be of an opposite polarity. Although four balanced positions may be found at which the detector plate current equals 0.5 ma., the inspection system will detect defects at only two of these positions. The position selected for operation is one of those in which the defect pulse produced is similar to that shown in FIGURE 7.

The number of balance coil positions at which the detector plate current is equal to 0.5 ma. can be reduced to one by adjusting the phase angle between the signal carrier voltage and the reference signal voltage. This is done by repositioning the slug core 75 of the tuned input transformer 61 until the detector plate current equals 0.5 ma. at only one position of the balancing coil 66. This adjustment causes a slight phase shift in the voltage on the limiter grid of the detector tube 105. The balancing coil 66 must be repositioned slightly each time the core of the input transformer 65 is adjusted. Having made these adjustments, the inspection system is ready for final installation in a production line.

In an installation, the testing coil assembly is mounted in line with a conveyor which propels the tubular workpiece through the testing coil assembly at a uniform speed. Having turned the power on to the inspection system 33, a defect free section of a tubular workpiece is passed into the testing coil assembly. The balance coil 66 is then adjusted so that the detector plate current indicates a current of 0.4 ma. to 0.6 ma. A tubular workpiece containing known calibration defects is passed through the testing coil assembly 32 several times. The sensitivity control potentiometer 128 is adjusted so that the defect signals produced by the calibration defects operate the alarm 137 and any other controls, such as a workpiece conveyor control to control movement of the conveyor.

OPERATION

The system is now ready for production operation. When a defective section of a tubular workpiece passes through the testing coil assembly, it produced instantaneous fluctuations in the phase and amplitude of the carrier voltage signal. The carrier signal is coupled by the impedance matching transformer 61 to the input of the band pass amplifier 80 where it is amplified and only the carrier frequency is passed to the Class A amplifier 90. The amplifier 90 then amplifies it and introduces it to the input of the phase detector 95 through the coupling capacitor 97. The level of the carrier voltage is reduced by the voltage divider circuit formed by resistor 98 and the potentiometer 99 prior to introducing it to the limiter grid of the detector tube 105. The changes in the amplitude of the carrier signal voltage have little effect on the output of the gated beam tube 105 because of the amplitude limiting action of the tube 105.

Figure 7:
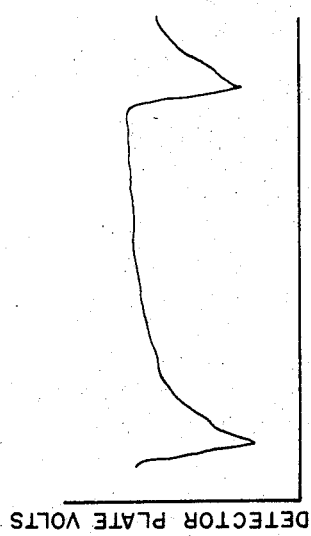
FIGURE 7 is an instantaneous voltage diagram of the output of a phase detector circuit of the present invention when a defect-free workpiece is being inspected.
Figure 8:
FIGURE 8 is an instantaneous voltage diagram of the output of the phase detector circuit when a defective workpiece is being inspected.

An instantaneous voltage diagram of the defect signal output of the gated beam detector tube 105 with a good tubular workpiece in the testing coil assembly is shown in FIGURE 7. FIGURE 8 is a diagram of the defect signal output of the gated beam detector tube 105 when a section of a tubular workpiece containing a small defect was centered inside the main detector coil winding 54. The average voltage seen at the plate of the gated beam tube 105 decreased when a defective section of a tubular workpiece was positioned in the center of the main detector coil winding 54 of the testing coil assembly 32. The defect in the tubular workpiece caused a reduction in the phase angle between the signal carrier voltage and the reference voltage. This increased the plate conduction time which reduces the area under the plate voltage curve.

Figure 9:
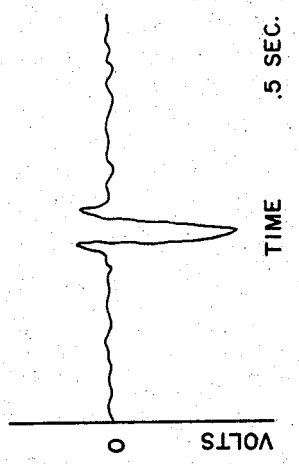
FIGURE 9 is an instantaneous voltage diagram of a defect signal pulse produced in response to a defect detected by the present system.

Thus, when defect-free tubular workpieces are passing through the testing coil assembly, the output of the gated beam tube 105 appears as is shown in FIGURE 7. When a defective workpiece passes through the coil assembly, the output of the tube 105 appears as is shown in FIGURE 8. These pulse outputs are integrated by the capacitor 115 which smooths out the ripples shown in FIGURES 7 and 8 and impresses substantially a DC voltage on conductor 125. When good tubular workpieces are passing through the testing coil assembly, a continuous DC voltage level is therefore provided to the coupling capacitor 126. When a defective workpiece passes through the testing coil, a rapid fluctuation occurs in the voltage provided to the coupling capacitor 126. This fluctuation is shown in FIGURE 9 and is passed by the coupling capacitor 126 as a defect signal pulse. The amplitude of the defect signal pulse is adjusted by the slider of the sensitivity control potentiometer 128 and is then introduced to the high pass filter 130. The high pass filter 130 differentiates the defect signal pulse shown in FIGURE 9 and the output of the high pass filter is proportional to the slope of the leading edge of the defect signal pulse. The differentiated signal pulse produced by the high pass filter is then coupled to the pulse amplifier 135 where it is amplified to operate the alarm circuit 137.

Unlike conventional detector circuits which require a signal null when a good pipe is in the testing coil assembly, the gated beam detector of the present system requires a continuous carrier. The amplitude of the continuous carrier is not critical to the operation of the gated beam detector. Optimum defect sensitivity is obtained when the carrier voltage impressed on the limiter grid of the gated beam tube is between .7 and 1.25 volts RMS. Thus, it is not necessary to obtain a perfect balance condition in the pick-up coil assembly 32 or by the balance unit 65 if used since a small carrier voltage is always provided to the defect signal input of the detector circuit 95. If an absolute balance was achieved by the detector coils 54–56, then the balance unit 65 would be set to provide a slight voltage and assure that the continuous carrier is provided to the detector 95. Small changes in the amplitude of the carrier signal caused by non-harmful variables in the tubular workpiece undergoing inspection or variables in the testing system itself will have little effect on the output of the detector because of the limiting action of the gated beam tube. Thus, a distinct advantage of the present system is that the high sensitivity of the detector circuit 95 is not affected by the above listed variables such as the temperature of the tubular workpiece or of a coolant flowing on the tubular workpiece while it is undergoing inspection. Further, it is not necessary to provide a balance unit for the present system when small diameter workpiece, e.g., one half inch, are inspected. The balance unit is required mainly for large diameter workpieces. When an adjusting unit is used for large size workpieces, only one balancing control is ever required.

Although the invention has been described in its preferred form, with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An apparatus for determining the presence of flaws in workpieces, said apparatus comprising:
   (a) a flaw pick-up unit arranged for movement relative to a workpiece to inspect the workpiece for flaws;
   (b) energizing means for inducing a high frequency current signal in the workpiece so as to produce a high frequency carrier signal in the pick-up unit;
   (c) an amplitude limiting and phase detecting circuit having a limiter input, a reference input, and an output;
   (d) first circuit means connecting the output of the pick-up unit to the limiter input of the amplitude limiting and phase detecting circuit to provide a defect information carrier signal to the limiter input;
   (e) second circuit means connecting the reference input to the energizing means to provide a reference signal to the reference input;
   (f) at least one of said circuit means including phase shifting means for shifting the phase of the signals applied to said inputs;
   (g) said amplitude limiting and phase detecting circuit being relatively unresponsive to changes in amplitude of the defect information carrier signal and being responsive to phase fluctuations of the carrier signal caused by defects in a workpiece to provide a defect signal at its output each time the carrier signal undergoes a predetermined phase fluctuation; and,
   (h) adjustable voltage means connected to said energizing means and to said pick-up unit for providing said high frequency current signal to said pick-up unit at a predetermined phase and amplitude so as to assure that the carrier signal is provided continuously to the limiter input of the amplitude limiting and phase detecting circuit.

2. An apparatus for determining the presence of flaws in workpieces, said apparatus comprising:
   (a) a flaw pick-up coil assembly arranged for movement relative to a workpiece to inspect the workpiece for flaws;
   (b) energizing means inducing a high frequency current signal in the workpiece which produces a high frequency signal in the pick-up coil assembly;

(c) said pick-up coil assembly having at least one main detector coil and at least one auxiliary detector coil, said coils being arranged in differential relation so that the signal induced in one coil substantially balances out the signal induced in the other coil when a defect free workpiece is being inspected;

(d) adjustable voltage means, connected to said energizing means and to said coils, for applying said high frequency current signal at a predetermined amplitude and phase to said coils so as to continuously provide a carrier signal output for all workpieces inspected;

(e) an amplitude limiting and phase detecting circuit having a limiter input, a reference input, and an output;

(f) first circuit means including an amplifier connecting the continuous carrier output of the pick-up coil assembly and the adjustable voltage means to the limiter input of the amplitude limiting and phase detecting circuit to provide a continuous defect information carrier signal to the limiter input;

(g) second circuit means connecting the reference input to the energizing means to provide a reference signal to the reference input;

(h) at least one of said circuit means including phase shifting means to shift the phase of the carrier signal relative to the reference signal;

(i) said amplitude limiting and phase detecting circuit being relatively unresponsive to variations in the amplitude of the defect information carrier signal introduced to its limiter input and being responsive to a phase fluctuation of the introduced carrier signal caused by defects in the workpieces being inspected to provide a defect signal at an output; and, (j) a defect indicator circuit connected to the output of the amplitude limiting and phase detecting circuit and providing a signal indication in response to a defect signal produced by the output of the amplitude limiting and phase detecting circuit.

3. The apparatus of claim 2 wherein the adjustable voltage means vectorily adds said high frequency current to the voltage across the coils to provide the carrier signal and when adjusted changes the amplitude of said high frequency current signal added to the coil voltage to assure the continuous carrier signal to the limiter input of the amplitude limiting and phase detecting circuit.

4. The apparatus of claim 2 wherein said first circuit means includes an impedance matching transformer for coupling the output of the pick-up unit to the input of the amplitude limiting and phase detecting circuit, said impedance matching transformer having a capacitive element connected across an inductive winding element of the transformer to provide the phase shift between the reference and carrier signals.

5. The apparatus of claim 4 wherein the capacitive element and the inductive winding element form a nearly resonant circuit, and the electrical characteristics of at least one of said elements being adjustable to selectively shift the characteristics of the circuit between a more capacitive circuit and a more inductive circuit.

6. The apparatus of claim 5 wherein said first circuit means includes a band pass amplifier for amplifying the amplitude of the carrier signal and for passing only signals of a frequency near the frequency of the carrier signal.

7. The apparatus of claim 6 wherein said amplitude limiting and phase detecting circuit includes a gated beam tube having its limiter grid comprising the limiting input, its quadrature grid comprising the reference input, its plate connected to a power supply through a suitable voltage divider, and a voltage tap on the said voltage divider providing the output for the amplitude limiting the phase detecting circuit.

8. The apparatus of claim 7 including a capacitive integrating element connected to said voltage tap and across said gated beam tube to smooth out a ripple in the output of the gated beam tube so that when a non-defective workpiece is traveling relative to the pick-up coil assembly, a substantially continuous DC voltage level is produced by the output of the amplitude limiting and phase detecting circuit.

9. The apparatus of claim 8 including a capacitive coupling element interposed between said indicator circuit and the output of the amplitude limiting and phase detecting circuit whereby defects in the workpiece produce an instantaneous voltage change which is not smoothed by the integrating element and is passed by the coupling element to the indicator circuit.

10. The device of claim 9 wherein the input of the amplitude limiting and phase detecting circuit includes a potentiometer connecting the limiter grid of the gated beam tube to the output of the band pass amplifier whereby the carrier signal impressed on the limiter grid of the gated beam tube is adjusted between 0.7 and 1.25 volts RMS.

11. A flaw inspection device for indicating the presence of flaws in workpieces, said apparatus comprising:

(a) a pick-up coil assembly arranged for movement relative to the workpiece;

(b) a power supply circuit;

(c) an energizing means connected to said power supply circuit for inducing an eddy current in the workpiece whereby the eddy current in the workpiece induces a corresponding high frequency signal in the coil assembly;

(d) said pick-up coil assembly including first and second pick-up coils arranged in differential, voltage opposing relation so that no more than a low level carrier signal appears across said pick-up coils when a defect free workpiece is being inspected;

(e) an amplifier including a band pass filter being connected to the output of the pick-up coil assembly and amplifying said carrier signal and passing a frequency band width containing the fundamental frequency of the carrier signal;

(f) an impedance matching transformer interposed between the pick-up coil assembly and the amplifier for providing the proper impedance matching between them, said impedance matching transformer including a capacitive element for providing an adjustable resonant circuit and phase shifting the carrier signal relative to the reference signal;

(g) a gated beam tube having a limiter grid connected to the output of the amplifier through a potentiometer and a quadrature grid connected to the power supply so that the power supply provides a reference signal of carrier frequency to the quadrature grid;

(h) a capacitive element connected to the plate of the gated beam tube for integrating plate voltage changes of the tube so as to provide a substantially constant DC output when defect free workpieces are being inspected;

(i) a high pass filter having an input and an output;

(j) a coupling capacitor connected to the plate of the gated beam tube and to the input of the high pass filter for passing rapid fluctuations in the DC output voltage of the gated beam tube caused by a defect detected in the workpiece to the high pass filter;

(k) said high pass filter differentiating a defect signal pulse passed by the coupling capacitor and producing an output signal pulse which is proportional to the slope of the leading edge of the defect signal pulse; and, (l) indicator means connected to the output of the high pass filter and providing a signal indication for each differentiated signal pulse received.

12. The device of claim 11 including an adjustable voltage means interposed between the pick-up coil assembly and the impedance matching transformer for vectorily adding a second high frequency signal from said energizing means to the voltage across the pick-up coils and being adjustable to adjust said second high frequency signal to assure a continuous carrier voltage provided to the limiter grid of the gated beam tube regardless of the amplitude of said low level carrier signal provided by the differentially arranged pick-up coils.

13. An apparatus for determining the presence of flaws in workpieces, said apparatus comprising:
   (a) a flaw pick-up coil assembly arranged for movement relative to a workpiece to inspect the workpiece for flaws;
   (b) energizing means for inducing a high frequency current signal in the workpiece to produce a high frequency signal in the pick-up coil assembly;
   (c) adjustable voltage means, connected to said energizing means and to said flaw pick-up coil assembly, for applying said high frequency current signal to said flaw pick-up coil assembly to continuously provide a signal output from said flaw pick-up coil assembly;
   (d) a phase detecting circuit having a signal input, a reference input, and an output;
   (e) first circuit means for applying said signal output of said pick-up coil assembly to said signal input of said phase detecting circuit to provide a continuous defect information signal to said signal input of said phase detecting circuit;
   (f) second circuit means connecting the reference input to the energizing means to provide a reference signal to said phase detecting circuit;
   (g) at least one of said circuit means including phase shifting means for shifting the phase of said input signal relative to said reference signal;
   (h) said phase detecting circuit being relatively unresponsive to variations in the amplitude of the defect information input signal introduced into its signal input and being responsive to phase fluctuations of the introduced defect signal input caused by defects in the workpieces being inspected so as to provide a defect signal at an output; and,
   (i) a defect indicator circuit connected to the output of said phase detecting circuit for providing a signal indication in response to a defect signal produced by the output of said phase detecting circuit.

14. An apparatus for determining the presence of flaws in workpieces in accordance with claim 2 in which said voltage means includes:
   (j) a first transformer coil electrically connected in series with said energizing means to create a magnetic field which fluctuates in intensity in proportion to the fluctuations in amplitude of said high frequency current signal; and,
   (k) a second transformer coil electrically connected in series with said flaw pick-up coil assembly to have a current flowing through it which varies in proportion to the high frequency signal induced in said pick-up assembly from said high frequency current signal in said workpiece;
   (l) said second transformer coil being adjustably mounted with respect to said first transformer coil whereby the coefficient of coupling between said first coil and said second coil may be altered to vary the voltage induced in said second coil from said current flowing in said first coil;
   (m) connecting means electrically coupling the combined output from said second coil and said flaw pick-up coil assembly to said first circuit means whereby defect information is applied to said first circuit means, which defect information includes the vector sum of the current induced in said pick-up coil assembly and an adjustable current induced in said second coil from said first coil.

15. A method of determining the presence of flaws in workpieces comprising the steps of:
   (a) generating an alternating current;
   (b) inducing eddy currents in said workpiece from the magnetic field of said alternating current;
   (c) inducing an eddy current signal into a coil from the magnetic field created by said eddy currents in said workpiece;
   (d) adding said alternating current attenuated to a predetermined level to said eddy current signal to produce a defect information signal;
   (e) applying a predetermined phase shift to at least one of said defect information signals and said alternating current; and,
   (f) comparing the phases of said defect information signal and said alternating current, whereby the amount of phase difference between said defect information signal and said alternating current indicates the presence of defects in said workpiece.

16. A method for determining the presence of flaws in workpieces in accordance with claim 15 further including the step of limiting the amplitude of said defect information signal prior to comparing the phase of said defect information signal with the phase of said generated voltage.

17. A method for determining the presence of flaws in workpieces comprising the steps of:
   (a) generating a reference voltage;
   (b) inducing eddy currents in said workpieces from the magnetic field of said reference voltage;
   (c) inducing an eddy current signal voltage from the magnetic field created by said eddy currents;
   (d) adding a signal which varies in amplitude proportionally to variations in amplitude of said generated reference voltage to said induced eddy current voltage;
   (e) adjusting the amplitude of said added voltage until the voltage resulting from said vector addition has a continuous small amplitude when said workpiece contains no flaws and a larger amplitude when said workpiece does contain flaws to provide a continuous defect information signal;
   (f) obtaining a phase comparison signal which varies in amplitude in proportion to the variations in amplitude of said generated reference signal;
   (g) changing the phase of at least one of said defect information signal and said comparison reference signal until there is a predetermined phase difference between the two when said workpiece contains no flaws; and,
   (h) comparing the phase of said defect information signal with the phase of said comparison reference signal, whereby phase differences between said defect information signal and said comparison reference signal of a predetermined amount from said predetermined phase difference indicates a defect in said workpieces.

References Cited

UNITED STATES PATENTS

| | | | |
|---|---|---|---|
| 2,189,092 | 2/1940 | Urmenge | 324—40 |
| 2,416,517 | 2/1947 | Farrow | 324—89 |
| 2,455,792 | 12/1948 | Meunier | 324—34 |
| 2,806,992 | 9/1957 | Foerster | 324—34 |

RUDOLPH V. ROLINEC, *Primary Examiner.*

R. J. CORCORAN, *Assistant Examiner.*